No. 760,060. PATENTED MAY 17, 1904.
G. H. DORR.
CAMERA.
APPLICATION FILED DEC. 5, 1902.
NO MODEL. 2 SHEETS—SHEET 1.
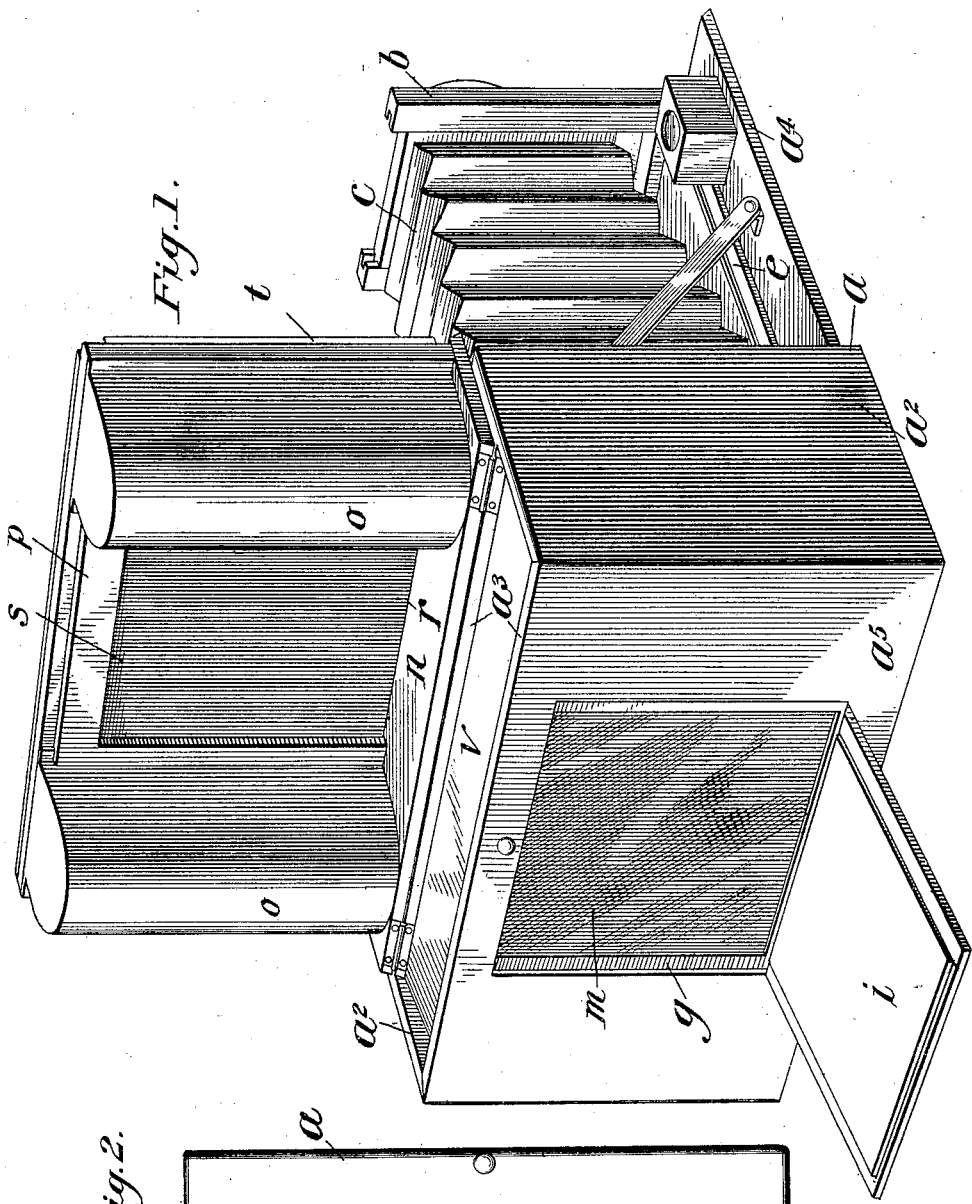
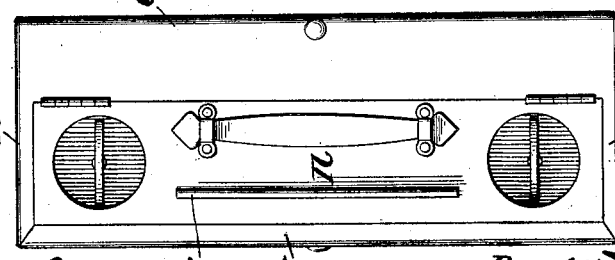
Witnesses:
E. P. Garzee
Inventor:
George H. Dorr,
By William F. Hall,
Atty.

No. 760,060. PATENTED MAY 17, 1904.
G. H. DORR.
CAMERA.
APPLICATION FILED DEC. 5, 1902.
NO MODEL. 2 SHEETS—SHEET 2.
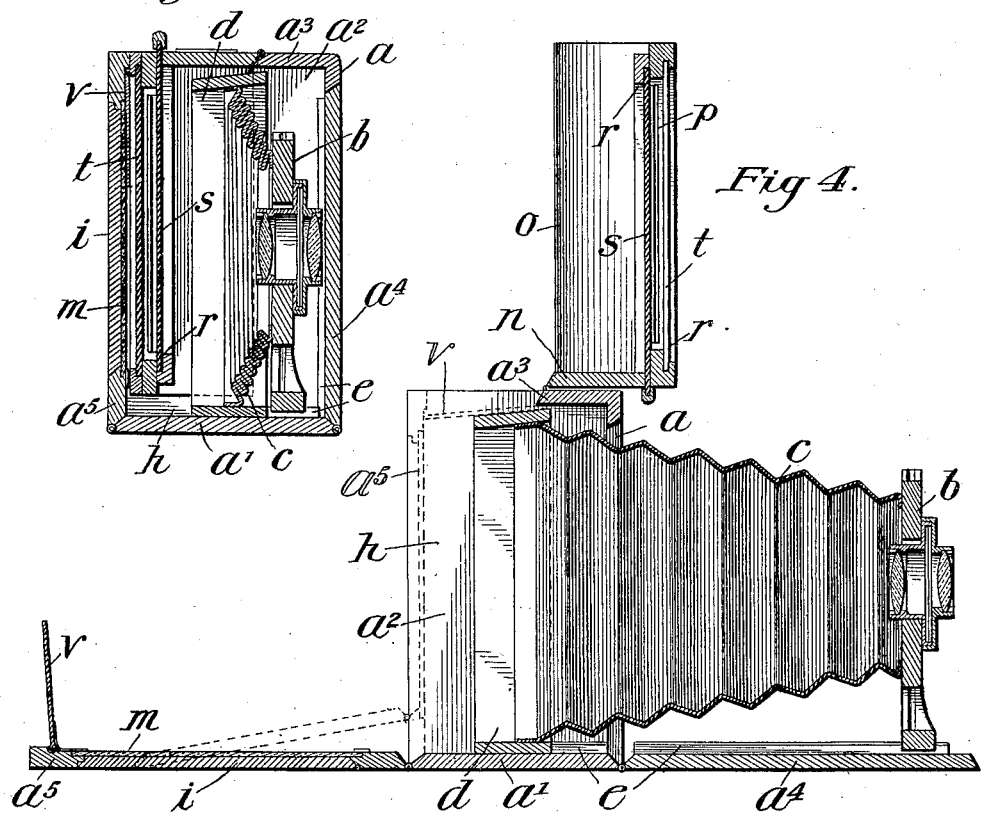
Witnesses:
Inventor: George H. Dorr,
By William R. Baird,
Atty.

No. 760,060. Patented May 17, 1904.

UNITED STATES PATENT OFFICE.

GEORGE H. DORR, OF NEW ROCHELLE, NEW YORK.

CAMERA.

SPECIFICATION forming part of Letters Patent No. 760,060, dated May 17, 1904.

Application filed December 5, 1902. Serial No. 133,941. (No model.)

*To all whom it may concern:*

Be it known that I, GEORGE H. DORR, of New Rochelle, in the county of Westchester and State of New York, have invented certain new and useful Improvements in Cameras, of which the following is a specification.

My invention relates to film photographic cameras or to that type of photographic cameras in which a sensitive film or band is employed having a plurality of receiving-sections which are successively brought into register with the camera-lens to receive the image.

One object of my invention is to provide in a camera including a part carrying a focusing-glass and lens and a second part carrying the film a compact and simple construction and arrangement which will permit the second part to be moved relative to the first part to carry the film into the compass of the light-rays passing through the lens or out of register with the lens and focusing-glass without exposing the film to the light.

Another object of my invention is to provide a camera with a section having a focusing-glass, a lens, and a film-holder compartment, and a film-holder section permanently connected to the first section designed to fit into the film-holder compartment therein and to be removed entirely therefrom to occupy a position outside of the same, the first section having means for closing the holder-compartment against the penetration of light when the film-holder is removed.

Other objects of the invention will appear and the many advantages thereof be appreciated when the same is more fully described.

The invention includes the construction, combination, and arrangement of parts to be hereinafter described, and particularly pointed out in the claims.

While the invention is susceptible of various modifications, I have illustrated in the accompanying drawings and shall hereinafter describe what is now conceived to be the preferred embodiment of the same.

In the drawings, Figure 1 shows a camera constructed according to my invention with the film-holder in its outward position, so that the camera may be focused. Fig. 2 is a top plan view of the camera, showing the same in closed position. Fig. 3 is a transverse sectional view of the camera with the parts in closed position. Fig. 4 is a longitudinal sectional view of the camera, showing the parts in their extended positions, the film-holder being shown in its outward position. Fig. 5 is a rear elevation of the film-holder.

In the exemplification of my invention illustrated herein the same is disclosed as embodied in a folding camera, as it presents certain advantages which well adapt the same to such a construction; but, as will be understood, the invention may be embodied in other types of cameras.

In the accompanying drawings the outer box of the camera is designated by the letter $a$ and includes a bottom $a'$, corresponding sides $a^2$, a top $a^3$, a front hinged door $a^4$, and a rear hinged door $a^5$.

Associated with the box $a$ is a slidable lens-frame $b$, carrying the lens or lenses and shutter mechanism, and a bellows $c$, connected at one end to said frame $b$ and at its opposite end to a stationary open rectangular frame $d$, fixed in the box $a$ centrally thereof. The frame $b$ is guided, as usual, upon a track $e$, made in two sections, one of which is secured to the bottom $a'$, while the other is secured to the door $a^4$ in position to register with the first section when said door occupies its open position, as shown in Fig. 4.

Centrally of the door $a^5$ an opening $g$ is located, to one wall of which a supplemental door $i$ is hinged for closing the same, and upon the inner face of this door $a^5$ a focusing-glass $m$ is arranged which completely closes said opening $g$, this glass being preferably countersunk in said face. When the door $a^5$ is in closed position, the glass $m$ is held in register or axial alinement with the lens to be within the compass of the light-rays passing through the latter.

In the box $a$ between the frame $d$ and the door $a^5$ when in closed position a chamber $h$ is located, designed to receive the film-holder $n$. In the present exemplification of my invention this holder is permanently attached to the box $a$ in a manner which will permit the same to swing into a position to occupy said chamber $h$ and to swing into a second position wholly without said chamber. The preferable construction for effecting this purpose is illustrated in the accompanying drawings, in which the holder $n$ is shown as hinged to the rear edge of the top $a^3$ of the box $a$.

The holder $n$ is of a construction which will completely inclose the film to protect the same from the light and is provided with means for feeding said film to successively bring the several receiving-sections thereof or sections of the sensitive surface of the same within the compass of the light-rays passing through the camera-lens, and it is further so constructed that the film may be readily placed within and removed from the same and that the sections of said film may be exposed to the light-rays passing through the lens when the holder is in place within its receiving-chamber $h$. In the particular embodiment of that part of my invention relating to the holder $n$ shown in the accompanying drawings the same includes a shell or casing comprising end roll-holding chambers $o$ and a film-passage $p$, extending between the two chambers $o$ and opening thereinto at its opposite ends. In the front wall of this passage $p$ in a position to register with the lens or be within the light-rays passing through the latter is an opening $r$, with which a cover-plate $s$ is associated. Through this opening $r$ when the holder $n$ is within the chamber $h$ the film is designed to be exposed upon the shutter controlling the lens being operated. The cover $s$, associated with the opening $r$, is intended to completely close the same when the holder is removed from the chamber $h$, so as to exclude all light from the interior of the holder. This cover $s$ in the present embodiment of my invention is constructed as a slide which is guided in ways in the front wall of the film-passage and through a slot in the top of the holder $n$, said slide being provided with means accessible at all times ouside of said top to permit of the ready manipulation thereof. The rear wall of the film-passage $p$ and the rear walls or sections of the walls of the roll-chambers $o$ are both preferably formed by a shiftable member $t$, which may be moved into a position to give access to the film-receiving spaces in order that the film may be placed within and removed from the holder. The member $t$ is shown in the accompanying drawings as a slide mounted in suitable guides to move in a direction transversely of the holder $n$, and the same is preferably provided with a sight-opening $u$, with which the characters indicated upon the back of the film to indicate the individual receiving-sections are intended to register, this opening being covered by a translucent plate.

In order that the camera may be focused, it is necessary to shift the film from between the lens and the focusing-glass, and to effect this purpose the holder $n$ is carried out of its chamber $h$ and thrown into a position to one side of the same, resting upon the top $a^3$ of the box $a$, as shown in Fig. 4.

In order to exclude the light from the chamber $h$ or from between the ground glass and the lens, except such light as may pass through the latter, so as not to interfere with the proper focusing of the camera, I have designed means for closing the top of said chamber $h$ when the holder $n$ is carried out of the latter. The particular means for effecting this purpose disclosed in the present embodiment of my invention comprises a plate $v$, carried by the door $a^5$, which is designed to close the space between the top $a^3$ and side walls $a^2$ of the box $a$ and the door $a^5$, this space being closed normally by the top of the holder $n$.

The plate $v$ is preferably pivotally secured at one of its edges to the door $a^5$, so that it may fold down thereagainst when not in use, and preferably has associated therewith a spring $w$ for automatically throwing the same outwardly when the door $a^5$ is opened, so as to occupy a position to bridge the space between said door $a^5$ and top $a^3$ when said door is closed. To insure a light-tight fit between this plate and the box, the leading edge thereof preferably fits snugly between the overhanging rear edge of the top $a^3$ and the contiguous wall of the frame $d$.

When the camera is in position to make an exposure or to take a picture, the holder $n$ occupies its place within the chamber $h$, the slide $s$ is withdrawn to expose the film within the passage $p$, and the door $a^5$ and supplemental door $i$ are closed, the plate $v$ being folded down to lie against the face of the door $a^5$ or within a slight recess formed therein. With the parts in this position if it be desired to focus the camera the slide $s$ is first pushed in to close the opening $r$, and the door $a^5$ is then opened to permit the holder to be swung around out of the chamber $h$ and into a position at rest upon the top $a^3$ of the box $a$. The door $a^5$ is then again closed, and the plate $v$, having been automatically thrown out, closes the top of the chamber $h$, the free edge of said plate entering, as described, beneath the rear edge of the top $a^3$. The supplemental door $i$ is then opened and the camera focused in the usual manner. When the proper focus is obtained, the holder $n$ is thrown down to reassume its former position in the chamber $h$, and after the shutter controlling the lens is closed the slide $s$ is withdrawn. The sensitive surface of the film in register with the opening $r$ is then in position to receive the image as soon as the shutter controlling the lens is opened.

An important feature of the construction described is that no movement of the film occurs within the holder during the movement of the latter relative to the box. Consequently the camera may be focused to take a picture upon one of the receiving-sections of the film, and if for any reason the exposure is not made directly after the holder is returned to its position the camera may be focused any number of times thereafter, and when the picture is finally secured it will be taken upon the section of the film for which the camera was first focused. Thus the film itself is operated exactly as in the ordinary non-focusing film-cameras, the manipulation of the parts necessary to focus my camera in no wise affecting said film or the feeding thereof.

The construction and operation of my invention will be readily understood upon reference to the foregoing description and accompanying drawings, and it will be appreciated that the parts and combinations recited may be varied within a wide range without departing from the spirit of the same.

Having thus described my invention, what is claimed as new, and desired to be secured by Letters Patent, is—

1. In a camera and in combination, a box, a lens and focusing-glass associated therewith, said box having a film-holder-receiving chamber, and a film-holder carrying a supply-spool and a winding-reel, said holder being permanently attached to said box and movable into and entirely out of said chamber, substantially as described.

2. In a camera and in combination, a box, a lens and focusing-glass associated therewith, and a film-holder section carrying a supply-spool and a winding-reel, said section being pivotally connected to said box to be swung bodily into and entirely out of the same, substantially as described.

3. In a camera and in combination, a box, a lens and focusing-glass associated therewith, said box having a film-holder-receiving chamber, interposed between the lens and the focusing-glass, and a film-holder pivotally connected to said box to permit the same to be swung into and out of said chamber, substantially as described.

4. In a camera and in combination, a box, a lens and a focusing-glass associated therewith, a chamber located between the ground glass and the lens, and a film-holder pivotally connected to the top of said box to swing into a position above said top and into a position below the same, substantially as described.

5. In a camera and in combination, a box, a lens and focusing-glass associated therewith, said box having a film-holder-receiving chamber therein, and a film-holder connected to said box to be shifted into a position at rest within the chamber, and to be shifted into a second position at rest entirely out of said chamber, substantially as described.

6. In combination, in a camera, a box, a lens and focusing-glass associated therewith, said box having a film-holder-receiving chamber therein, and a film-holder section carrying a supply-spool and a winding-reel, said section being hinged at its top to the top of said box to swing into and out of said chamber, substantially as described.

7. In a camera and in combination, a box, a lens and focusing-glass associated therewith, said box having a film-holder-receiving chamber therein and a film-holder connected to said box to be shifted into a position at rest within the chamber and to be shifted into a second position at rest entirely out of said chamber, and means for closing said chamber to exclude the light when the holder is in the second position, substantially as described.

8. In a camera and in combination, a box, a lens and focusing-glass associated therewith, said box having a film-holder-receiving chamber therein, and a film-holder connected to said box to be shifted into a position at rest within the chamber, and to be shifted into a second position at rest entirely out of said chamber, and means for closing the space, normally closed by the top of the holder when said holder occupies said second position, substantially as described.

9. In combination, in a camera, a box including a pivoted rear door, said box having a film-holder-receiving chamber therein in advance of said door, a lens associated with the box, a focusing-glass carried by the door, and a film-holder permanently connected to the box and adapted to be moved into and out of said chamber, substantially as described.

10. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, and means carried by the door for closing the top of said chamber when the holder is removed therefrom, substantially as described.

11. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, and a plate carried by the door for closing the top of said chamber when the holder is removed therefrom, substantially as described.

12. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, and a plate pivoted directly to said door for closing the top of said chamber when the holder is removed therefrom, substantially as described.

13. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, and a plate pivotally supported from said door for closing the top of said chamber when the holder is removed therefrom, substantially as described.

14. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, a plate pivotally supported from said door for closing the top of the chamber when the holder is removed therefrom, and means associated with said plate for automatically throwing the same outwardly, substantially as described.

15. In combination, in a camera, a box including a pivoted rear door, said box having a film-holder-receiving chamber therein in advance of said door, a lens associated with the box, a focusing-glass carried by the door, a film-holder permanently connected to the box and adapted to be moved into and out of said chamber, a plate pivotally supported from said door for closing the top of said chamber when the holder is removed therefrom, and a spring associated with said plate for automatically throwing the same outwardly, substantially as described.

16. In combination, in a camera, a box including a pivoted rear door, said box having a film-holder-receiving chamber therein in advance of said door, a lens associated with the box, a focusing-glass carried by the door, a film-holder pivotally connected to the top of the box, and a plate carried by the door designed to bridge the space between the latter and the rear edge of the top, when the holder is removed from its receiving-chamber within the box, substantially as described.

17. In combination, in a camera, a box including a pivoted rear door, said box having a film-holder-receiving chamber therein in advance of said door, a lens associated with the box, a focusing-glass carried by the door, a film-holder pivotally connected to the top of the box, and a plate carried by the door designed to bridge the space between the latter and the rear edge of the top when the holder is removed from its receiving-chamber within the box, the leading edge of said plate entering beneath said rear edge of the top, substantially as described.

18. In a camera, the combination with a box-section having a lens, a focusing-glass and a roll-holder-receiving chamber interposed between the two, of a film-holder permanently connected to said section and designed to occupy the chamber therein comprising end roll-holding compartments and a film-passage between the two including a movable member forming one wall of said passage, substantially as described.

19. In a camera, the combination with a box-section having a lens, a focusing-glass and a roll-holder-receiving chamber interposed between the two, of a film-holder pivotally connected at one of its edges to the contiguous part of said section, said holder having end roll-holding compartments, a film-passage between the two including a movable member forming one wall of said passage, the opposite wall of said passage having an exposure-opening therein, and means for closing the same, substantially as described.

20. In a camera, the combination with a box-section having a lens, and a focusing-glass, of a film-holder carrying a supply-spool and a winding-reel and comprising end chambers and a film-passage extending between the two having means associated with the same for protecting the film and for exposing the same, and a connection between said holder and box-section for permitting the holder to be moved bodily to occupy a position in alinement with the lens or a second position out of alinement with the lens, substantially as described.

21. A camera comprising a box having a hinged rear door, a focusing-glass carried thereby, a lens associated with the box, a roll-holder hinged to the box to be shifted into and out of the light-rays passing through said lens, said holder having roll-holding chambers at each end thereof and a film-passage, and comprising a casing having a sliding part constituting one wall of said passage, the opposite wall of said passage having a film-exposure opening in the same, a slide for closing the latter, and means for closing the box, to prevent the light from entering the same between the lens and the focusing-glass, when the holder is removed from said box, substantially as described.

22. In a camera and in combination, a box-section, a lens arranged at the front of the box-section, a focusing-screen arranged at the rear of the box-section, a film-holder carrying a supply-spool and winding-reel, and a hinged connection between the film-holder and box-section for swinging the film-holder into a position in which the film will intersect the light-rays passing through the lens, and into a second position for carrying the film out of the path of said rays to permit focusing on said screen, substantially as described.

23. In a focusing film-camera, a box-section having a bellows and a lens associated with the same, a film-holder comprising end roll-holding compartments and a film-passage extending between the two having means associated therewith for protecting the film and for exposing the same, and a permanent connection between the upper portion of the box-section and the film-holder constructed to permit the film-holder to swing into a position in alinement with the lens and into a second position out of alinement therewith, and a focusing-screen.

In testimony whereof I have hereunto signed my name, in the presence of two attesting witnesses, at New Rochelle, in the county of Westchester and State of New York, this 4th day of December, 1902.

GEORGE H. DORR.

Witnesses:
M. J. COMERFORD,
A. LARUS.

---

DISCLAIMER.

760,060.—*George H. Dorr*, New Rochelle, N. Y. CAMERA. Patent dated May 17, 1904.
Disclaimer filed May 23, 1905, by the patentee.

Enters his disclaimer—

"To the twentieth claim of his patent, which is expressed in the following words:

"20. In a camera, the combination with a box-section having a lens, and a focusing-glass, of a film-holder carrying a supply-spool and a winding-reel and comprising end chambers and a film-passage extending between the two having means associated with the same for protecting the film and for exposing the same, and a connection between said holder and boxsection for permitting the holder to be moved bodily to occupy a position in alinement with the lens or a second position out of alinement with the lens, substantially as described."—[*Official Gazette, May 30, 1905.*]